US008311300B1

(12) United States Patent
Matsumoto (10) Patent No.: US 8,311,300 B1
(45) Date of Patent: Nov. 13, 2012

(54) MEDICAL IMAGE PROCESSING APPARATUS AND METHOD

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 849 days.

(21) Appl. No.: 12/464,974

(22) Filed: May 13, 2009

Related U.S. Application Data (63) Continuation of application No. 12/423,251, filed on Apr. 14, 2009, now abandoned.

(51) Int. Cl.
*G06K 9/00* (2006.01)
(52) U.S. Cl. ........................ 382/128
(58) Field of Classification Search .......... 382/131, 382/154, 294
See application file for complete search history.

(56) References Cited

U.S. PATENT DOCUMENTS

| | | | | |
|---|---|---|---|---|
| 5,608,849 A | * | 3/1997 | King, Jr. ............... | 345/419 |
| 6,106,466 A | * | 8/2000 | Sheehan et al. ........ | 600/443 |
| 6,887,192 B1 | * | 5/2005 | Whayne et al. ........ | 600/16 |
| 7,803,122 B2 | * | 9/2010 | Pfeiffer et al. ........ | 600/500 |
| 7,907,760 B2 | * | 3/2011 | Doyle ................... | 382/128 |
| 8,103,070 B2 | * | 1/2012 | Roberts et al. ........ | 382/128 |
| 2005/0254708 A1 | * | 11/2005 | Jolly et al. ............ | 382/173 |
| 2007/0041658 A1 | | 2/2007 | Mishima et al. | |

OTHER PUBLICATIONS

Frangi, A.F. et al. Three-Dimensional Modeling for Functional Analysis of Cardiac Images: A Review. In: IEEE Transactions on Medical Imaging, vol. 20, No. 1, Jan. 2001, pp. 2-25.

* cited by examiner

*Primary Examiner* — Tom Y Lu
(74) *Attorney, Agent, or Firm* — Pearne & Gordon LLP (57) ABSTRACT

There is provided a medical image processing apparatus matching a plurality of image data. The medical image processing apparatus includes: an image data storage that stores at least two image data of different phases of single target object; a node creating portion that creates nodes, wherein the nodes are related to positions in each of the at least two image data; a local force field calculating portion that calculates local force fields for the nodes, based on positions of the nodes and the at least two image data; a local force calculating portion that calculates local forces, each of which is acted in a corresponding one of the local force fields, from the local force fields; and an image deforming portion that deforms the positions of the nodes based on the local forces.

14 Claims, 14 Drawing Sheets

FIG. 1B Diastole phase

FIG. 1A Systole phase

FIG.2B

Diastole phase

FIG.2A

Systole phase

MEDICAL IMAGE PROCESSING APPARATUS AND METHOD

TECHNICAL FIELD

The present disclosure relates to a medical image processing apparatus and method for performing non-rigid registration based on a dynamic local force field.

RELATED ART

For example, US2007/0041658A1 describes a non-rigid image matching algorithm based on a potential field.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

According to one or more aspects of the present invention, there is provided a medical image processing apparatus matching a plurality of image data. The medical image processing apparatus includes: an image data storage that stores at least two image data of different phases of single target object; a node creating portion that creates nodes, wherein the nodes are related to positions in each of the at least two image data; a local force field calculating portion that calculates local force fields for the nodes, based on positions of the nodes and the at least two image data; a local force calculating portion that calculates local forces, each of which is acted in a corresponding one of the local force fields, from the local force fields; and an image deforming portion that deforms the positions of the nodes based on the local forces.

According to one or more aspects of the present invention, there is provided a medical image processing method for matching a plurality of image data. The method includes: (a) acquiring at least two image data of different phases of single target object; (b) creating nodes each of which is related to positions in each of the at least two image data; (c) calculating, by a processor, local force fields for each of the nodes, based on positions of the nodes and the at least two image data; (d) calculating local forces, each of which is acted in a corresponding one of the local force fields, from the local force fields; and (e) deforming the positions of the nodes based on the local forces.

Other aspects of the invention will be apparent from the following description, the drawings and the claims.

DETAILED DESCRIPTION OF EXEMPLARY EMBODIMENTS OF THE INVENTION

Exemplary embodiments of the present invention will be described with the drawings hereinafter.

Technologies such as Computed Tomography (CT) and Magnetic Resonance Imaging (MRI) are widely used for medical diagnoses using tomographic images of a living body. Moreover, volume rendering of rendering three-dimensional images from volume data of an object obtained by the above-mentioned technologies is used for medical diagnoses. Volume data are a set of pieces of data unique to the voxels included in a voxel space including a three-dimensional region of an object.

Figure 1A:
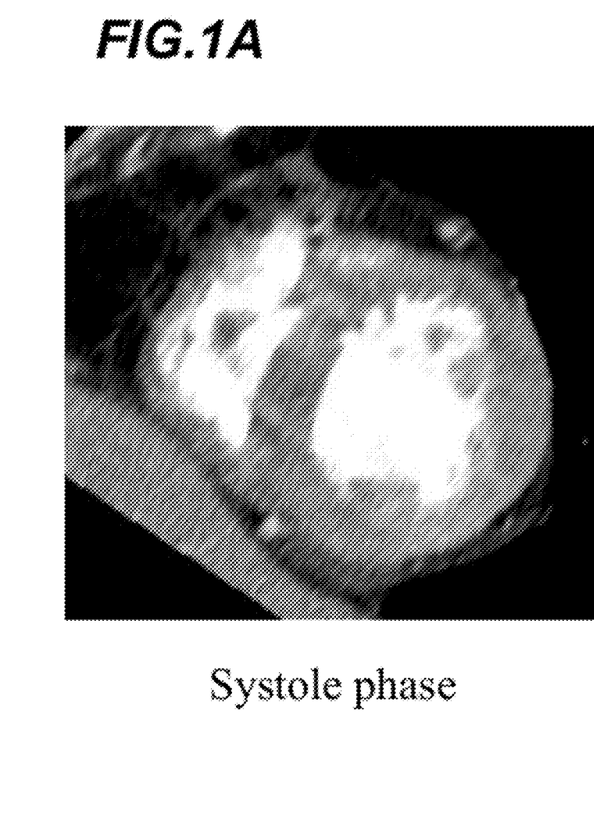
FIG. 1A is a view showing an example of a slice image in a voxel space including a heart in the systole phase.
Figure 1B:
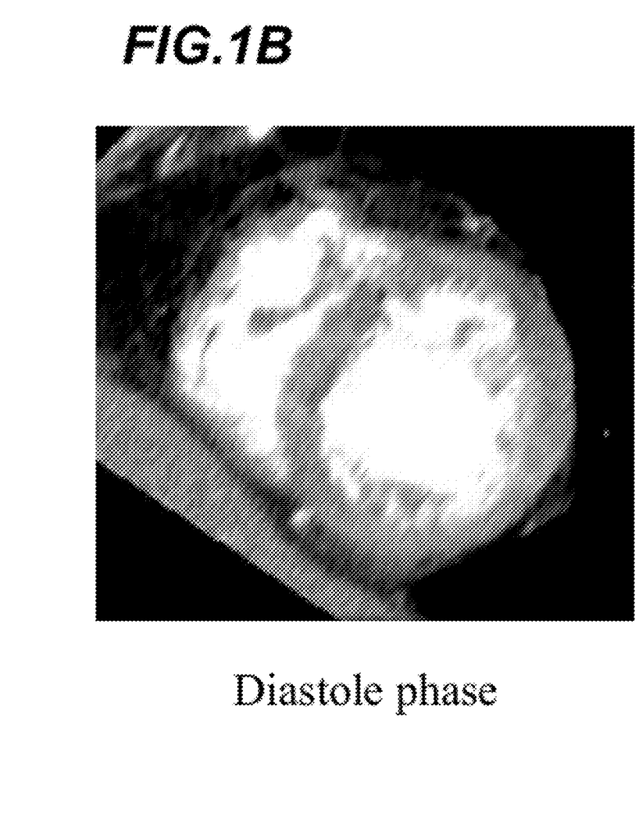
FIG. 1B is a view showing an example of a slice image in the voxel space including a heart in the diastole phase.
Figure 2A:
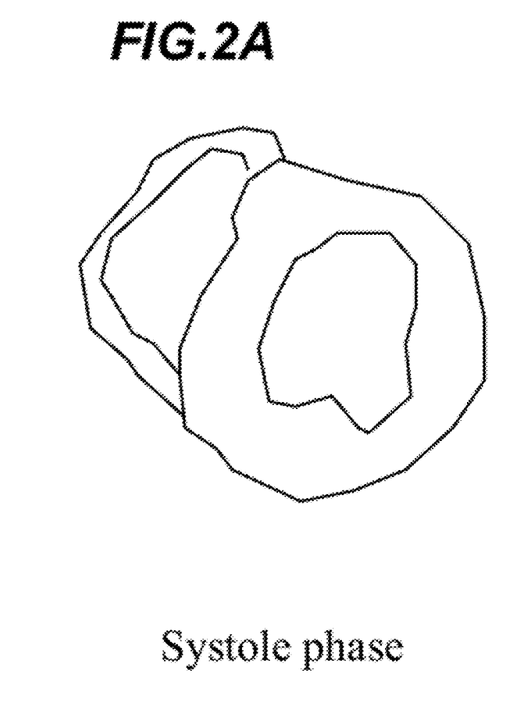
FIG. 2A is a view showing a shape of the outer and inner walls of the heart shown in FIG. 1A.
Figure 2B:
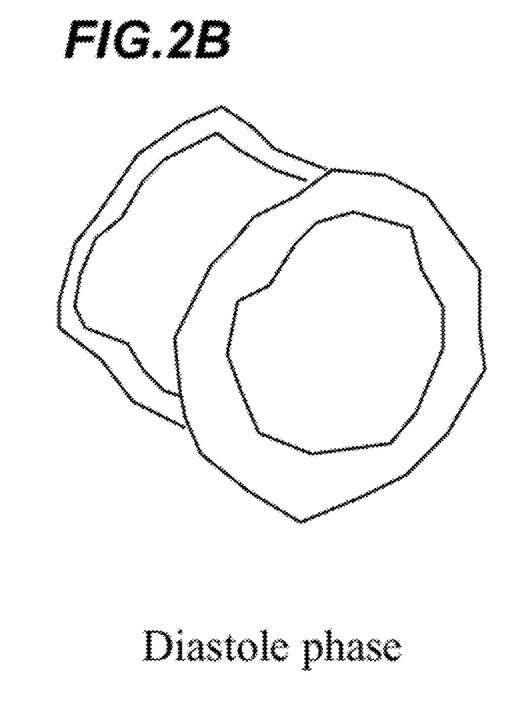
FIG. 2B is a view showing a shape of the outer and inner walls of the heart shown in FIG. 1B.

In a medical image processing apparatus according to an exemplary embodiment, which is described below, volume data of a voxel space including a heart are used. Since the heart beats, the systole phase in which the heart sends out blood to the whole body and the diastole phase in which the heart stores blood in itself are repeated alternately. FIG. 1A is a view showing an example of a slice image in a voxel space including the heart in the systole phase. FIG. 1B is a view showing an example of a slice image in the voxel space including the heart in the diastole phase. FIG. 2A is a view showing a shape of the outer and inner walls of the heart shown in FIG. 1A. FIG. 2B is a view showing a shape of the outer and inner walls of the heart shown in FIG. 1B.

Figures 3A, 3B:
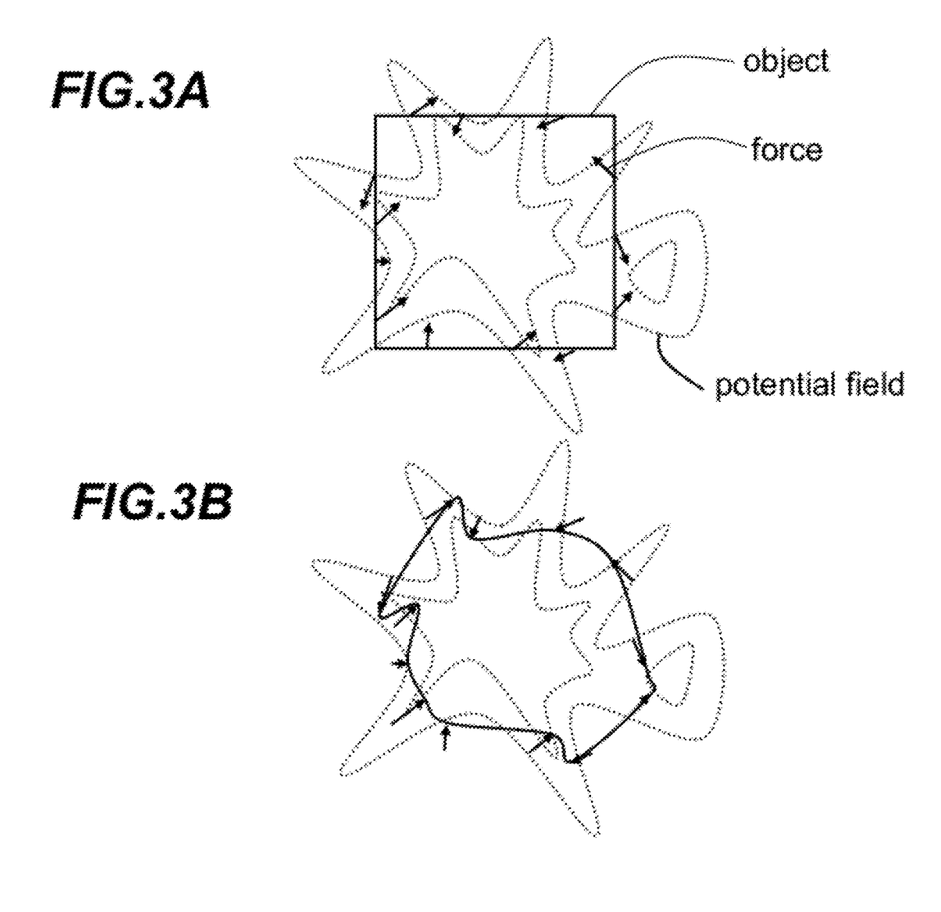
FIG. 3A is a view showing the concept of a method of deforming an object in images based on potential field.
FIG. 3B is a view showing problems of a method of deforming an object in images based on potential field.

As shown in FIGS. 1A to 2B, the shape of the heart differs between the systole phase and the diastole phase. Matching phases are required for analyzing condition and movement of the heart. Therefore, when matching the image of the heart in the systole phase and the image of the heart in the diastole phase, it is necessary to deform the images according to the condition and movement of the heart. In conventional image deforming method, deformation of the object in the images based on potential field. FIG. 3A is a view showing the concept of a method of deforming the object in the images based on a potential field cover the whole image (refer as global potential field). According to the method shown in FIG. 3A, the object is deformed based on gradients of the global potential field. Therefore, the computer that performs the processing according to the method calculates the force acted on the object, based on the global potential field.

However, medical images contain a lot of noises, various type of artifacts and the like, and the deformation directly using gradients of the global potential field frequently falls into a minimum solution or is numerically unstable as shown in FIG. 3B. This is significant when handling volume data.

Figure 4A:
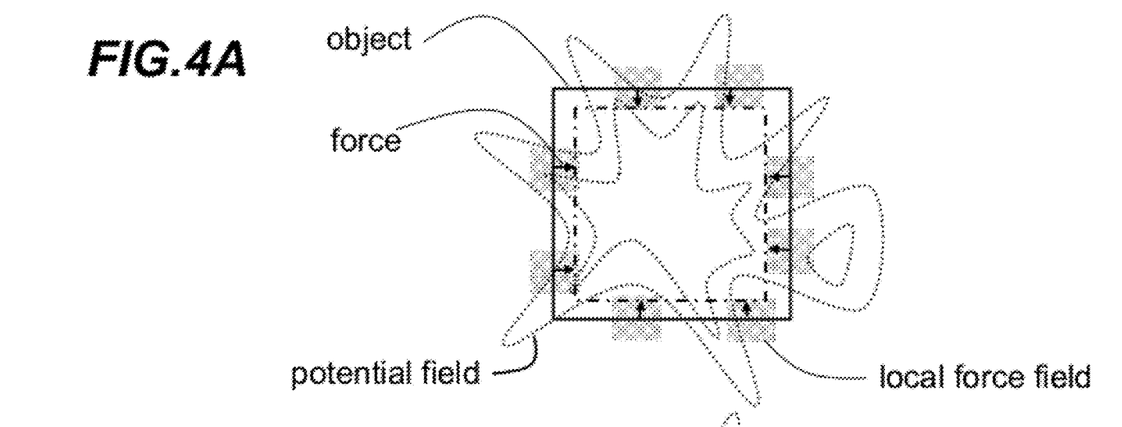
FIG. 4A is a view showing the concept of a method which is used by a medial image processing apparatus according to an exemplary embodiment of the present invention.
Figure 4B:
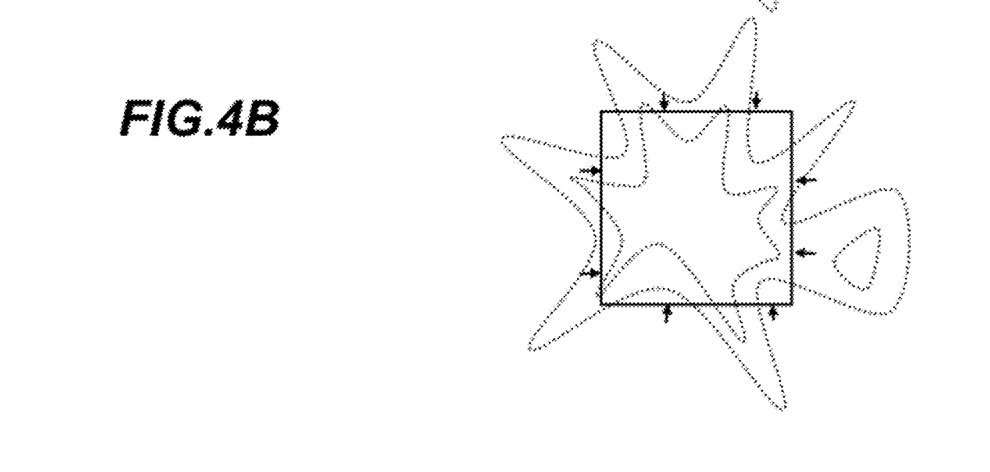
FIG. 4B is a view showing the effect of a method which is used by a medial image processing apparatus according to an exemplary embodiment of the present invention.

Meanwhile, in the exemplary embodiment, as shown in FIG. 4A, the voxel space including the object is divided into a plurality of local force fields and each force acted in every local force field is calculated. And, the object is deformed by the forces (FIG. 4B). Hereinafter, a medical image processing apparatus using the above method and the operation (medical image processing method) of the medical image processing apparatus will be described in detail.

Figure 5:
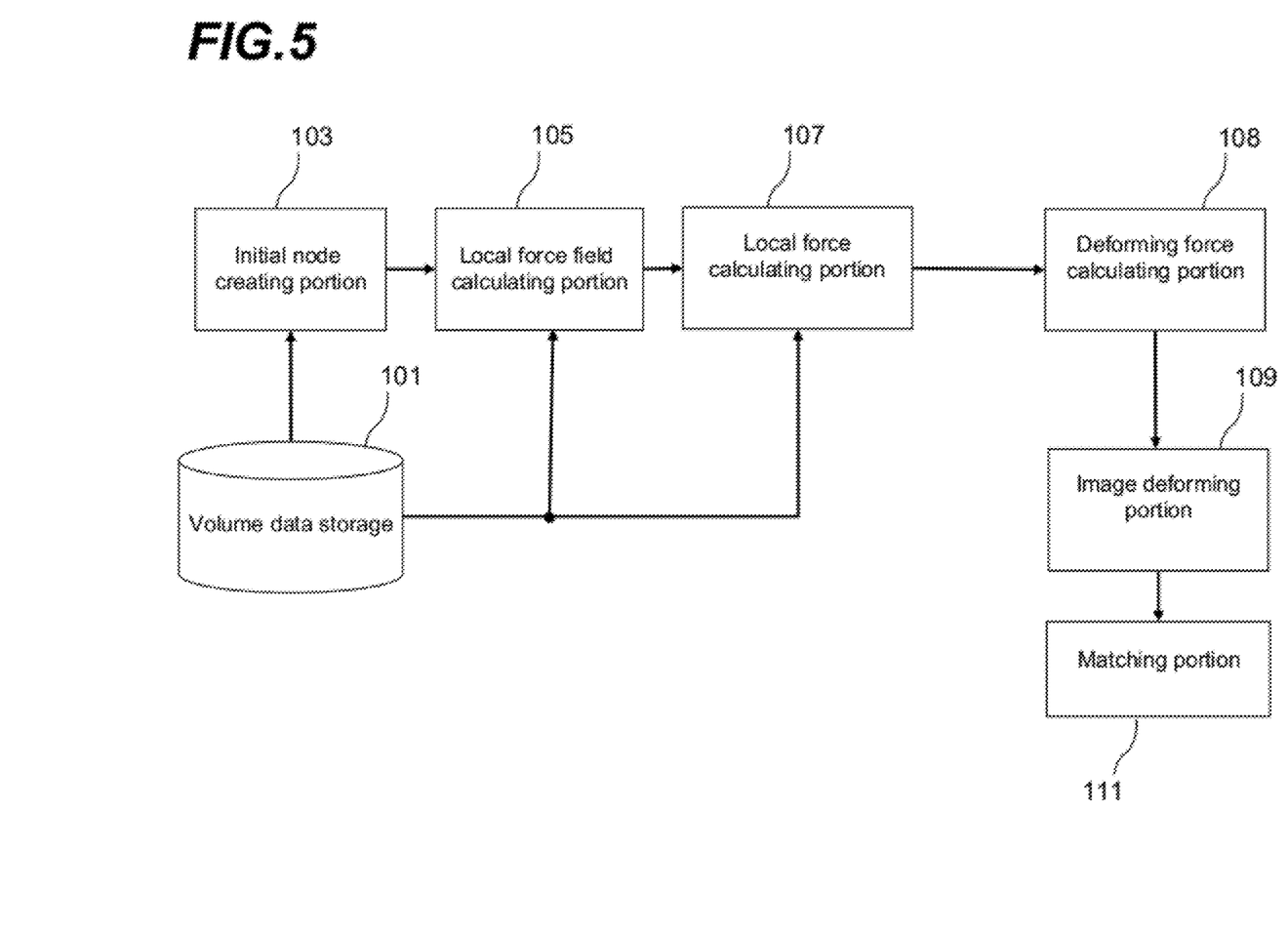
FIG. 5 is a block diagram showing an example of the configuration of the medical image processing apparatus according to the exemplary embodiment of the present invention.

FIG. 5 is a block diagram showing an example of the configuration of the medical image processing apparatus according to an exemplary embodiment of the present invention. The medical image processing apparatus shown in FIG. 5 is provided with a volume data storage 101, an initial node creating portion 103, a local force field setting portion 105, a local force calculating portion 107, an image deforming portion 109 and a matching portion 111. The initial node creating portion 103, the local force field setting portion 105, the local force calculating portion 107, the image deforming portion 109 and the matching portion 111 may be executed by a processor.

The volume data storage 101 stores the volume data of the voxel space including the heart (hereinafter, referred to merely as "volume data"). Since the heart beats, a plurality of phases are present in the time period required for one beat (cardiac cycle). The shape and size of the heart differ among the phases. Therefore, when the volume data are acquired using a technology such as CT or MRI, the volume data of each of the different phases are acquired. Consequently, for example, the volume data in the systole phase, the volume data in the diastole phase and the volume data in the several phases between the systole phase and the diastole phase are stored in the volume data storage 101.

Figure 6:
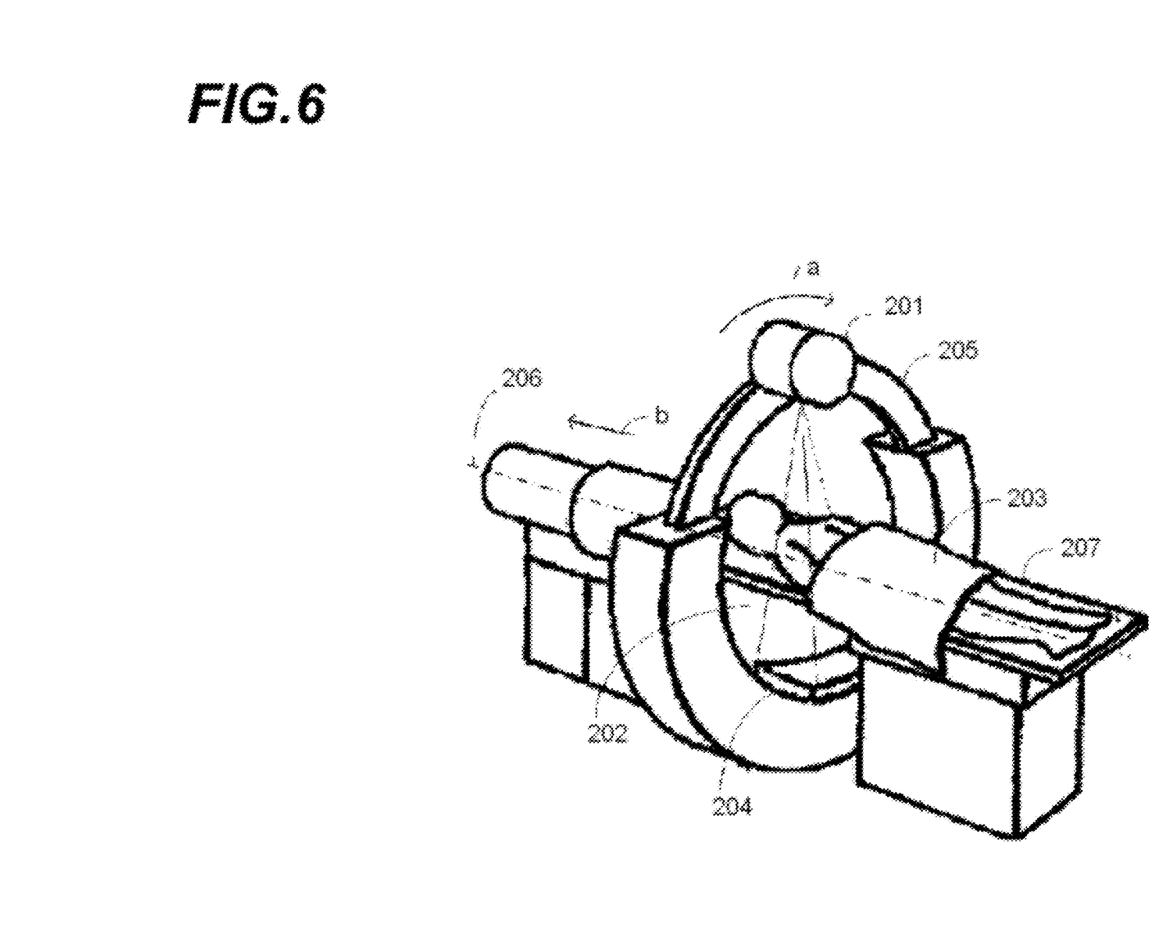
FIG. 6 is a schematic view showing a computed tomography (CT) apparatus used for acquiring the volume data.

FIG. 6 is a schematic view showing a computed tomography (CT) apparatus used for acquiring the volume data. As shown in FIG. 6, an X-ray beam bundle 202 shaped like a pyramid (shown by the chain line in the figure) is radiated from an X-ray source 201. The X-ray beam bundle 202 passes through a specimen (a patient 203) and is radiated to an X-ray detector 204. The X-ray source 201 and the X-ray detector 204 are arranged on a ring-like gantry 205 to face each other. The ring-like gantry 205 is configured to rotate (see the arrow a) around a system axis 206 passing through the central point of the gantry. The patient 203 lies down on a table 207 through which an X-ray passes. The table 207 is movable along the system axis 206 (see the arrow b).

As described above, the X-ray source 201 and the X-ray detector 204 rotate about the system axis 206, and move relatively to the patient 203 along the system axis 206. Consequently, to the patient 203, the X-ray beam bundle 202 radiated from the X-ray source 201 is projected at various projection angles and at various positions relative to the system axis 206. The volume data are created based on the output signal of the X-ray detector 204 generated at that time. The created volume data are stored in the volume data storage 101.

Figure 7:
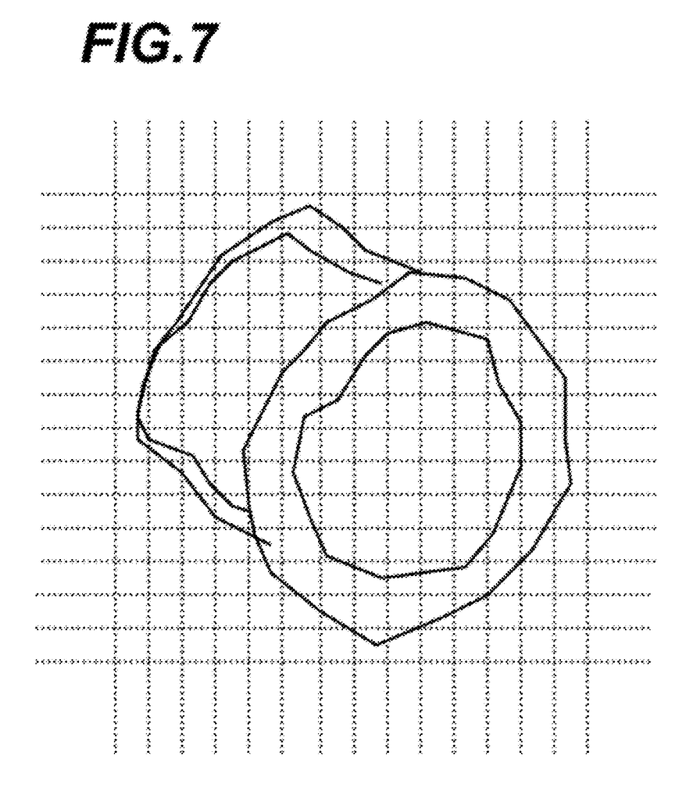
FIG. 7 is a view showing an example of a slice image in the voxel space and an example of a lattice on the slice image.

The initial node creating portion 103 sets a three-dimensional lattice in each of the voxel spaces represented by the volume data of plural phases stored in the volume data storage 101. The lattice shall preferably have lower resolution than the resolution of volume data. FIG. 7 is a view showing an example of a slice image in the voxel space and an example of the lattice on the slice image. The tissue shape may be expressed by a given finite element instead of the lattice.

Figure 8:
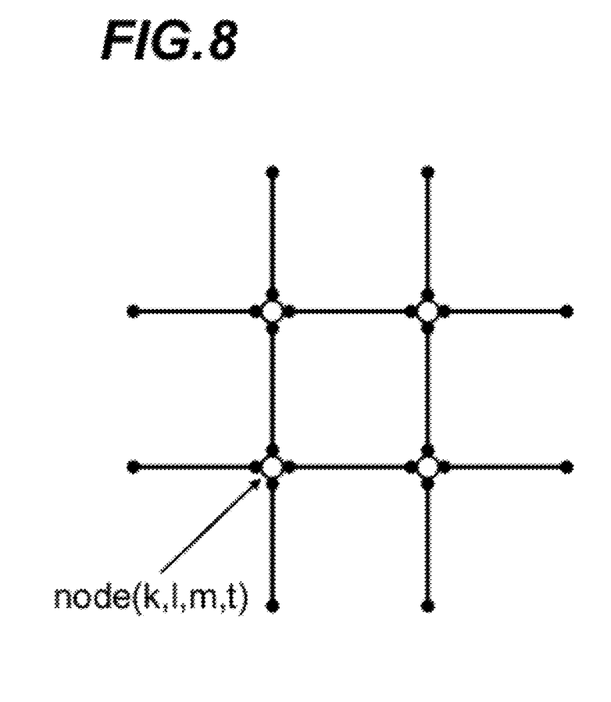
FIG. 8 is a view showing nodes on the lattice.

After setting the three-dimensional lattice in each voxel space, the initial node creating portion 103 sets a node at each grid point of the lattice. Nodes are linked by grid lines. As shown in FIG. 8, each node is expressed as a node(k,l,m,t). Of the four parameters k, l, m and t, the parameters k, l and m represent the three-dimensional position of the node on the lattice. And, certain node(k,l,m,t) have value (x,y,z) representing three-dimensional position in the voxel space. The parameter t represents the phase number of the heart included in each voxel space. The volume data of each of the voxels constituting the voxel space of the phase t is expressed as Vt(x,y,z). The parameters x, y and z represent the three-dimensional position of the voxel based on a coordinate system, unique to the voxel space, different from the above-mentioned three-dimensional lattice. The node and link deform to thereby express the deformation of the tissue.

How the nodes are affected by the local force field shall be described. Nodes are affected by the local force (local force field setting portion) and by the elastic force artificially set to the link which is the deformation force imitating the plastic resistance or the like (deforming force calculating portion). By this, the image deforming portion iteratively deforms the nodes to express image deformation.

Figure 10:
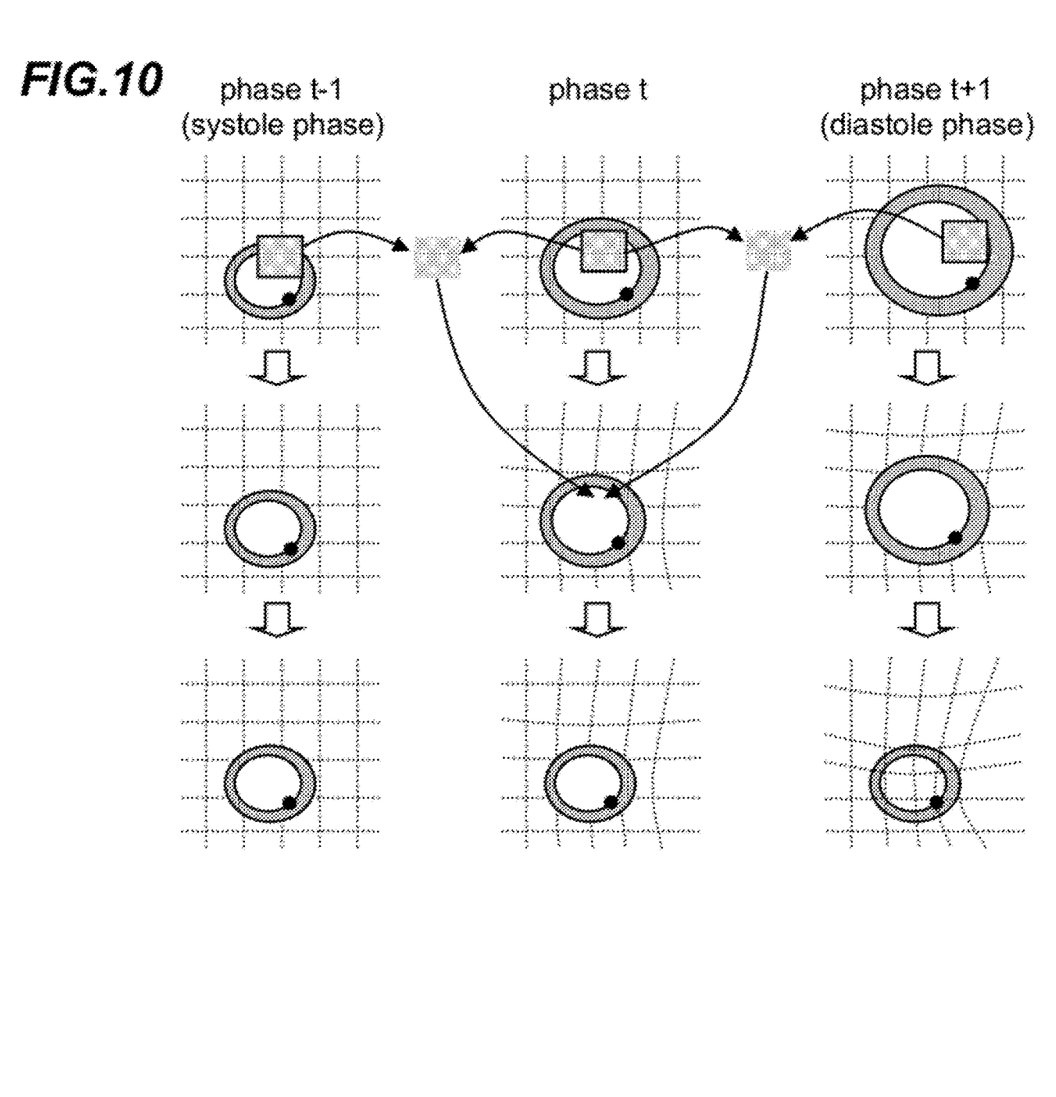
FIG. 10 is a view showing local force field corresponding to a node in the voxel space including the heart in a phase t between a phase t−1 (systole phase) and a phase t+1 (diastole phase) and the process in which the object included in the slice image obtained from the voxel space of each phase is deformed.

The local force field setting portion 105 calculates the local force field corresponding to each node from the information node(k,l,m,t) representing the three-dimensional position of each node for phase t and the voxel values neighboring Vt(x,y,z) of the three-dimensional position of each node among several phases. The local force field setting portion 105 calculates the local force field LFF(k,l,m,t,x,y,z) by using an expression (1) shown below. FIG. 10 is a view showing the local force field corresponding to a node in the voxel space including the heart in a phase t between a phase t−1 (systole phase) and a phase t+1 (diastole phase) and the process in which the object included in the slice image obtained from the voxel space of each phase is deformed.

$$LFF(k, l, m, t, x, y, z) = \qquad (1)$$

$$a * \sum_{\Delta x=-lx}^{lx} \sum_{\Delta y=-ly}^{ly} \sum_{\Delta z=-lz}^{lz} \text{absolute}\{V_t(\text{node}(k, l, m).x + \Delta x,$$

$$\text{node}(k, l, m).y + \Delta y, \text{node}(k, l, m).z + \Delta z) -$$

$$V_{t+1}(x + \Delta x, y + \Delta y, z + \Delta z)\} +$$

$$b * \sum_{\Delta x=-lx}^{lx} \sum_{\Delta y=-ly}^{ly} \sum_{\Delta z=-lz}^{lz} \text{absolute}\{V_t(\text{node}(k, l, m).x + \Delta x,$$

$$\text{node}(k, l, m).y + \Delta y, \text{node}(k, l, m).z + \Delta z) -$$

$$V_{t-1}(x + \Delta x, y + \Delta y, z + \Delta z)\}$$

As shown in the expression (1), to calculate the local force field corresponding to each node in the voxel space of the phase t, the local force field setting portion 105 uses the information of each of the voxel spaces of the preceding and succeeding phases t−1 and t+1. In the term multiplied by a coefficient "a" included in the right side of the expression (1), the volume data of the phase t and that of the phase t+1 are compared with each other to thereby derive the potential field at each node. In the term multiplied by a coefficient "b" included in the right side of the expression (1), the volume data of the phase t−1 and that of the phase t are compared with each other to thereby derive the potential field at each node. The local force field setting portion 105 calculates the local force field corresponding to each node by convoluting each potential field obtained by comparing the volume data of the phase t and those of the preceding and succeeding phases.

The following operation may be added when the local force field is calculated: A filter processing (e.g. a Gaussian filter, a median filter) is applied to the volume data used for the calculation of the local force field. A filter processing is applied to the calculated local force field.

While the local force field setting portion 105 uses the preceding and succeeding phases t−1 and t+1 to calculate the local force field of the phase t, it may perform the calculation by using only the information on one of the phases preceding and succeeding the phase t, for example, the phase t+1. In this case, the phases t and t+1 may be mutually used such as using the phase t+1 to calculate the local force field of the phase t and using the phase t to calculate the local force field of the phase t+1.

The local force calculating portion 107 calculates each force acted in every local force field calculated by the local force field setting portion 105 (hereinafter, referred to as "local force"). The local force is obtained from the local force field calculated by the local force field setting portion 105. The local force can be acquired by obtaining the gradient at the coordinates with respect to the local force field for a node. Therefore, as the local force field, it is necessary to calculate only a range sufficient for calculating the gradient.

Figure 9:
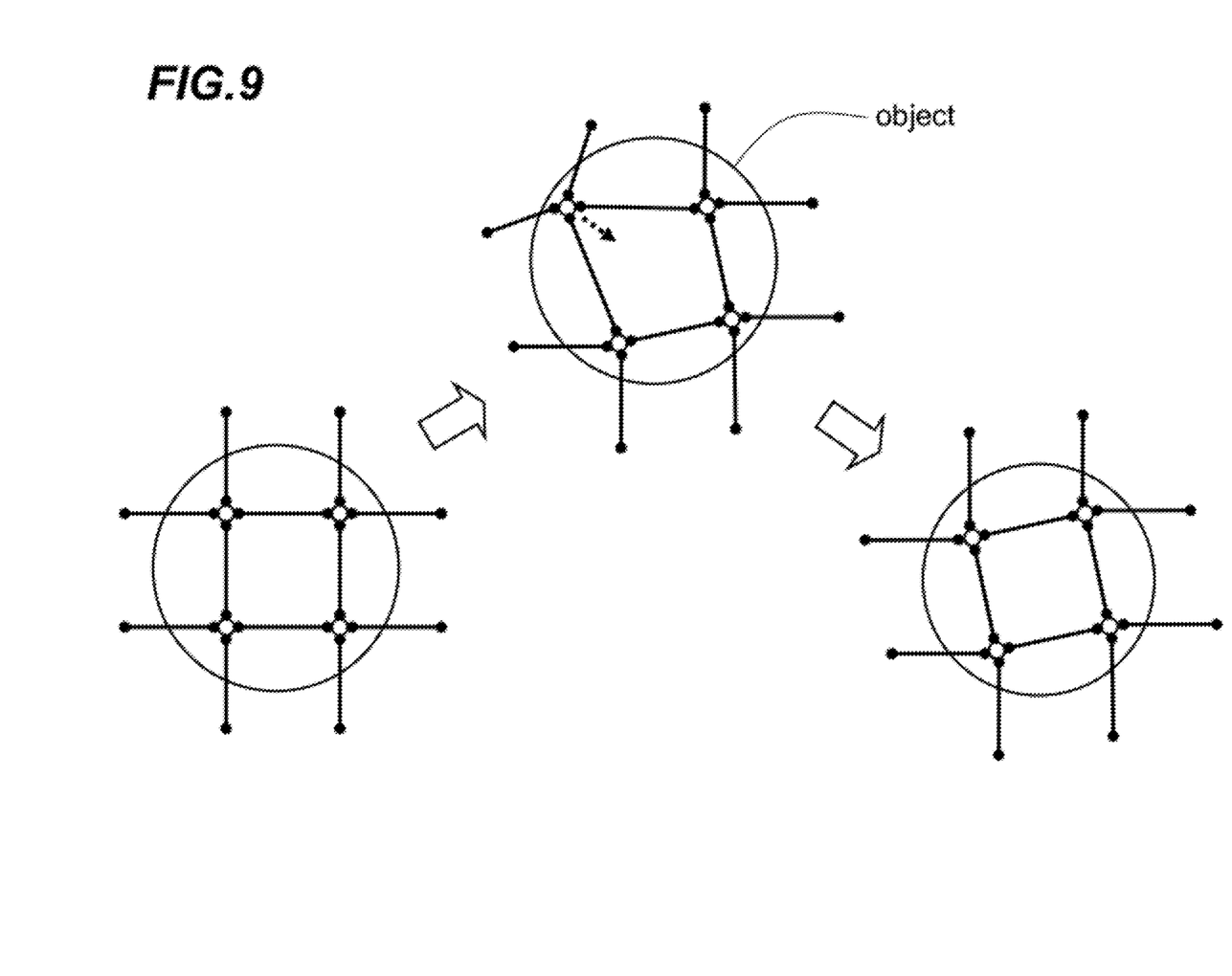
FIG. 9 is a view showing the process in which the object in the voxel space deforms analogously.

A deforming force calculating portion 108 affects the deformation of the deformed tissue by using the deformation force. This is because the accuracy of matching is improved by easily constructing a deformation model of the target tissue. Since the heart is constituted by muscle cells, its shape is estimated to be analogous among phases. FIG. 9 shows the process in which the object in the voxel space deforms analogously. In the example of FIG. 9, four nodes are included in the region of the object constituted by muscle cells, and a rectangle is formed by the four nodes and the links connecting the adjacent nodes. Although the nodes receive forces from the adjacent nodes, the shape of the rectangle formed by the four nodes and the links before and after the deformation of the object does not change. The nodes in the other region constituted by air and the like outside the region of the object have a high degree of freedom of movement since they receive no force from the adjacent nodes.

Therefore, the coefficients "a" and "b" in the expression (1) may be determined based on the premise that the object in the voxel space deforms analogously. An expression (2) shown below represents a coefficient "a" applied to the nodes in the region of the object constituted by muscle cells. An expression (3) represents a coefficient "a" applied to the nodes in the region of the object constituted by air and the like.

$$a = Func(Vt(\text{coordinates of node}(x, y, z)) = \begin{cases} 1 : 100 < v \\ 0.005 * v + 0.5 : 0 \le v \le 100 \\ 0.5 : v < 0 \end{cases} \quad (2)$$

(Here, v is the voxel value.)

$$a = Func(Vt(x, y, z)) = \begin{cases} 1 : 0 < v \\ 0.01 * v + 1 : -100 \le v \le 0 \\ 0 : v < -100 \end{cases} \quad (3)$$

(Here, v is the volume data.)

Figure 12A:
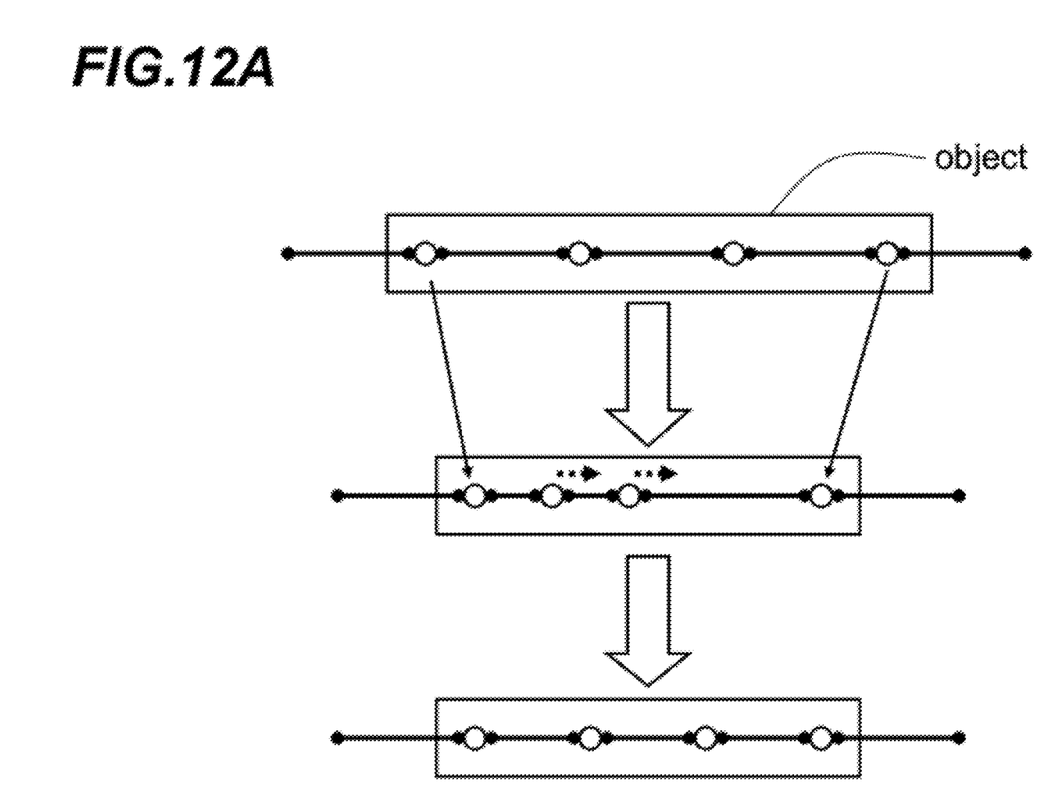
FIG. 12A is a view showing the process in which the force based on the elasticity of the object with the adjacent nodes is acted.

The deforming force calculating portion 108 may move the nodes in consideration of a value obtained by multiplying a force based on the elasticity of the object with the adjacent nodes by a weighting coefficient. FIG. 12A shows the process in which the force based on the elasticity of the object with the adjacent nodes is acted. In this case, the image deforming portion 109 calculates the three-dimensional position of the destination of movement of each node by using an expression (4) shown below. The force based on the elasticity of the object with the adjacent nodes is derived, for example, by introducing a spring model by a finite element method.

$$\text{node}(k,l,m,t) \Leftarrow \text{node}(k,l,m,t) + bt*\text{gradient}(LFF(k,l,m,t)) + \Sigma ct*\text{Func}(k,l,m,t) \quad (4)$$

In the expression (4), node(k,l,m,t) included in the right side represents the three-dimensional position of the node in the voxel space of the phase t before the movement. Moreover, gradient(LFF(k,l,m,t)) included in the right side represents the local force acted in the local force field corresponding to node(k,l,m,t). Moreover, Func(k,l,m,t) included in the right side represents the force based on the elasticity of the object with the nodes adjacent to node(k,l,m,t). Moreover, "bt" by which the gradient term is multiplied represents a coefficient. Moreover, "Σct" by which the Func(k,l,m,t) term is multiplied represents a weighting coefficient.

Figure 11:
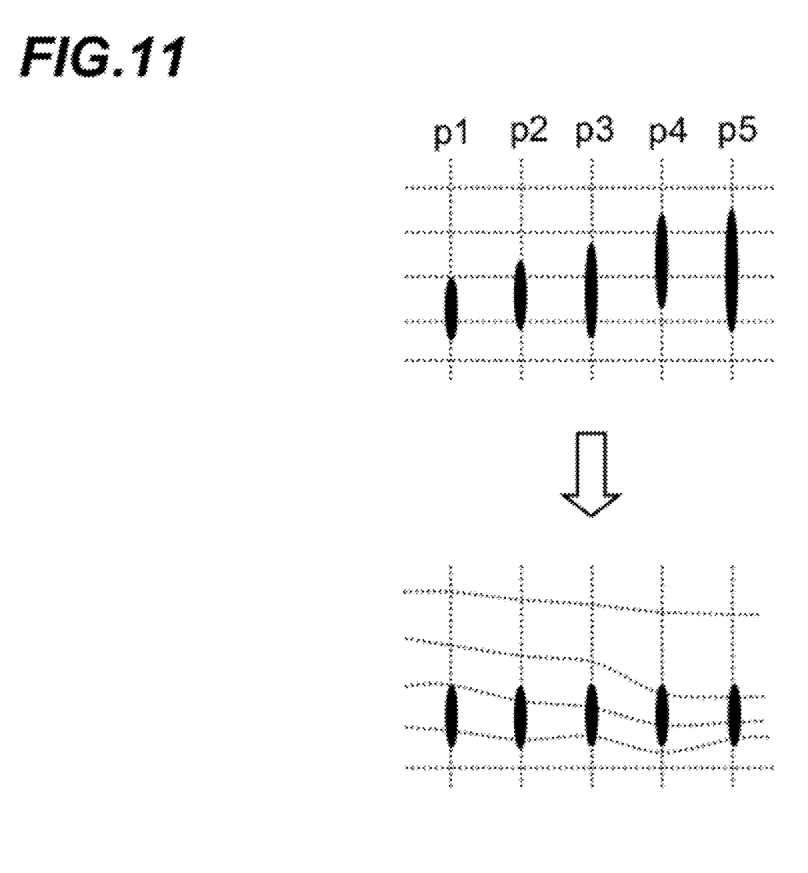
FIG. 11 is a cross-sectional view of the object before and after the deformation in five different phases (p1 to p5) viewed from one side.
Figure 12B:
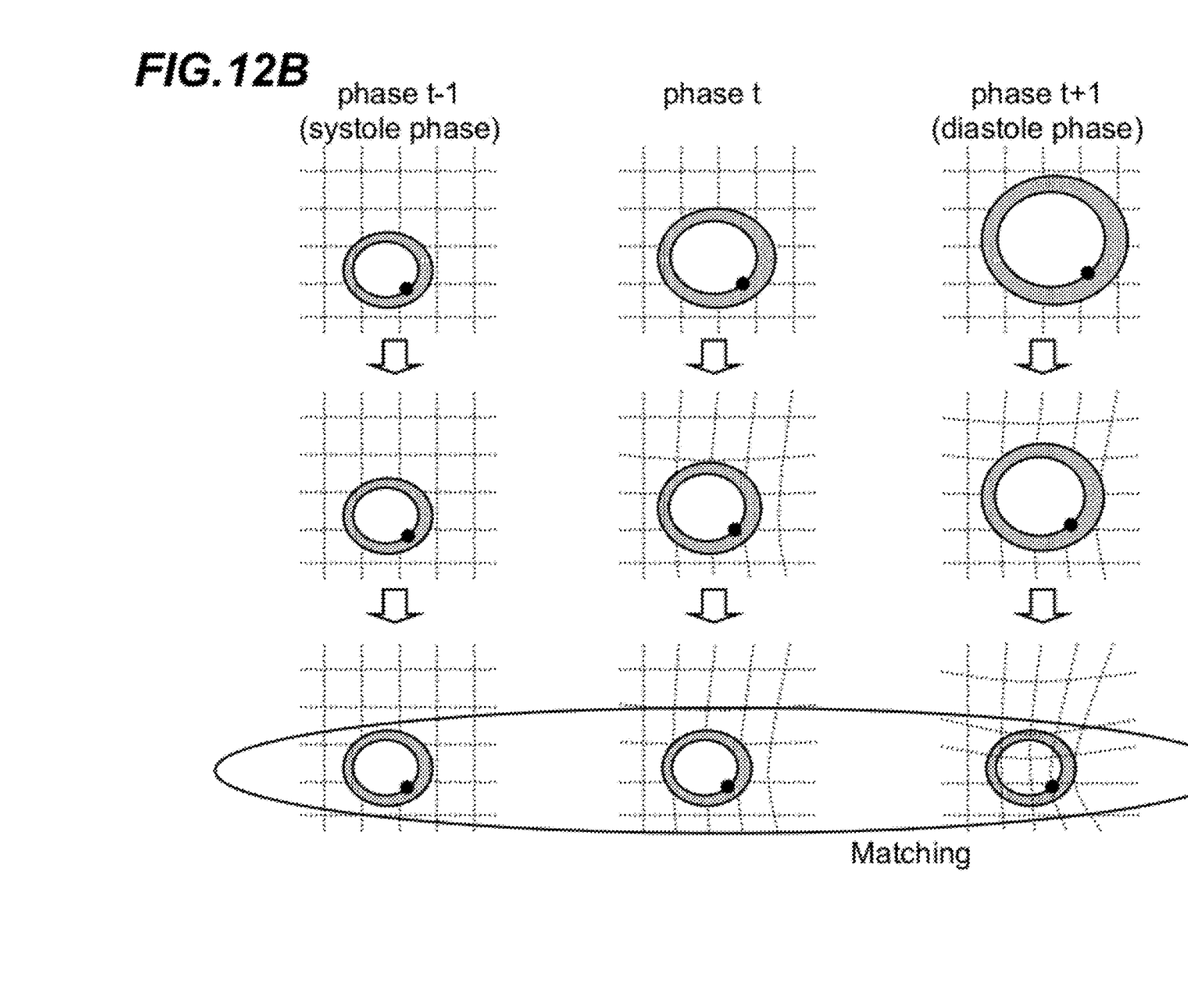
FIG. 12B is a view showing the local force field corresponding to the node in the voxel space including the heart in the phase t and the process in which the object included in the slice image obtained from the voxel space of each phase is deformed.

The node corresponding to the local force field in which the local force is acted is moved in the voxel space in response to the local force calculated by the local force calculating portion 107 and the deformation force calculated by the deforming force calculating portion 108. Thus, the image deforming portion 109 expresses a deformation of the tissue Then, the local force field, the local force and the deformation force are newly calculated using the result of the movement, so that the image deforming portion 109 deforms the tissue iteratively. Consequently, the heart, which is the object in the voxel space, deforms as shown in FIG. 12B. FIG. 11 is a cross-sectional view of the object before and after the deformation in five different phases (p1 to p5) viewed from one side.

The matching portion 111 matches the correspondence of the object in different phases. As shown in FIG. 12B, the matching portion 111 matches the image of the object deformed by the iteration of the image deforming portion 109 with the images of the object in the different phases. The deformation of the tissue can be grasped based on the node-link relationship when the matching is performed.

Figure 13:
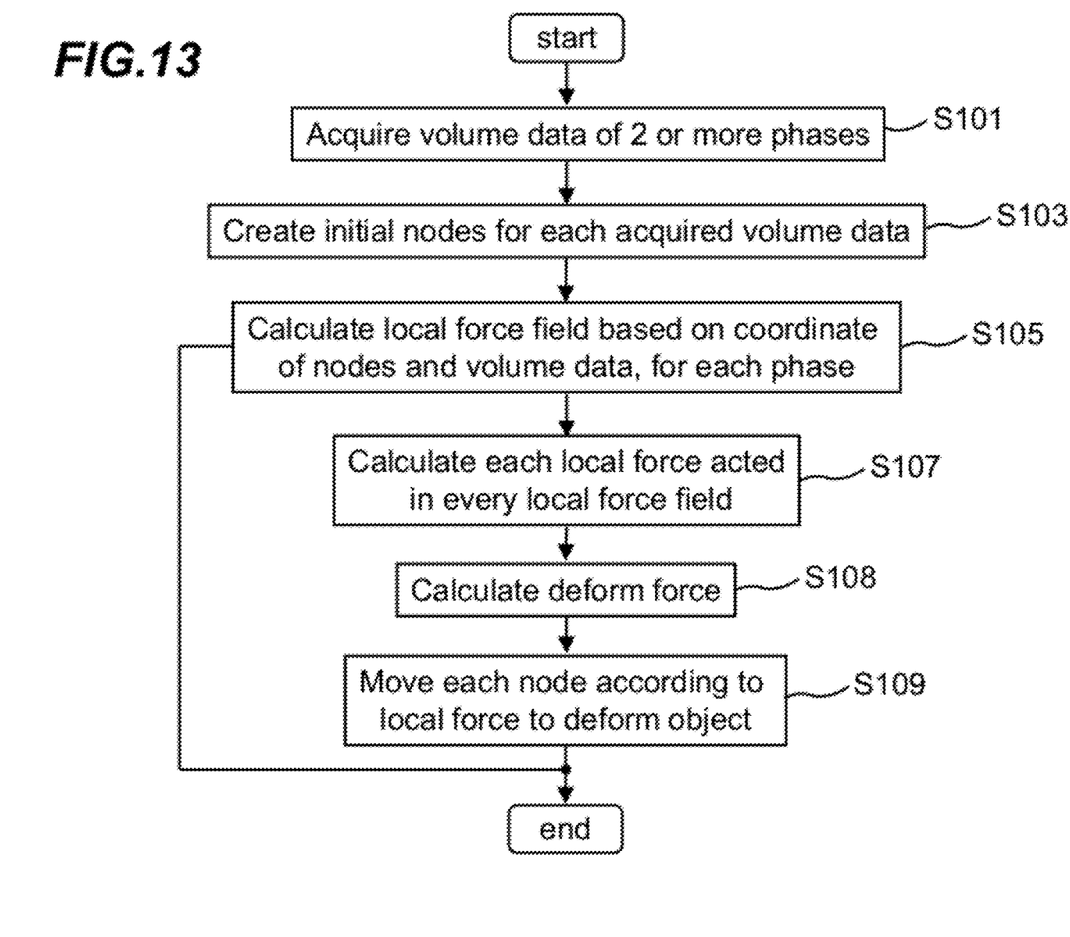
FIG. 13 is a flowchart showing the operation of the medical image processing apparatus shown in FIG. 5.

The operation of the medical image processing apparatus according to the exemplary embodiment will be described hereinafter. FIG. 13 is a flowchart showing the operation of the medical image processing apparatus shown in FIG. 5. As shown in FIG. 13, the initial node creating portion 103 acquires the volume data of two or more phases from the volume data storage 101 (step S101). Then, the initial node creating portion 103 sets a three-dimensional lattice in each voxel space represented by the volume data acquired at step S101, and sets a node at each grid point (step S103).

The local force field setting portion 105 calculates the local force field corresponding to each node, based on the coordinate information representing the three-dimensional position of each node calculated at step S103 and the volume data of the voxel corresponding to the three-dimensional position of each node, for each of the voxel spaces including the heart in the different phases (step S105). The local force calculating portion 107 calculates each local force acted in every local force field calculated at step S105 (step S107). The deforming force calculating portion 108 affects the deformation of the deformed tissue by using the deformation force.

The image deforming portion 109 moves each node corresponding to the local force field in which the local force is acted, in the voxel space, according to the local force calculated at step S107 and the deformation force calculated at step S108 (step S109). Consequently, the heart, which is the object in the voxel space, deforms. After performing step S109, the process returns to step S105, and repeatedly performs steps S105 to S109. That is, the local force field and the local force acted in every local force field and by the deformation force is re-calculated every time the node moves.

As described above, according to the medical image processing apparatus and the medical image processing method in the exemplary embodiment, the voxel space including the object is divided into plural local force fields and then each local force acted in every local force field is calculated. For this reason, it is necessary for the computer performing non-rigid registration only to perform the processing for each local force field. The amount of data the computer handles at this time is comparatively small. Therefore, the computer can perform a fast and accurate non-rigid registration with stability.

Figure 14:
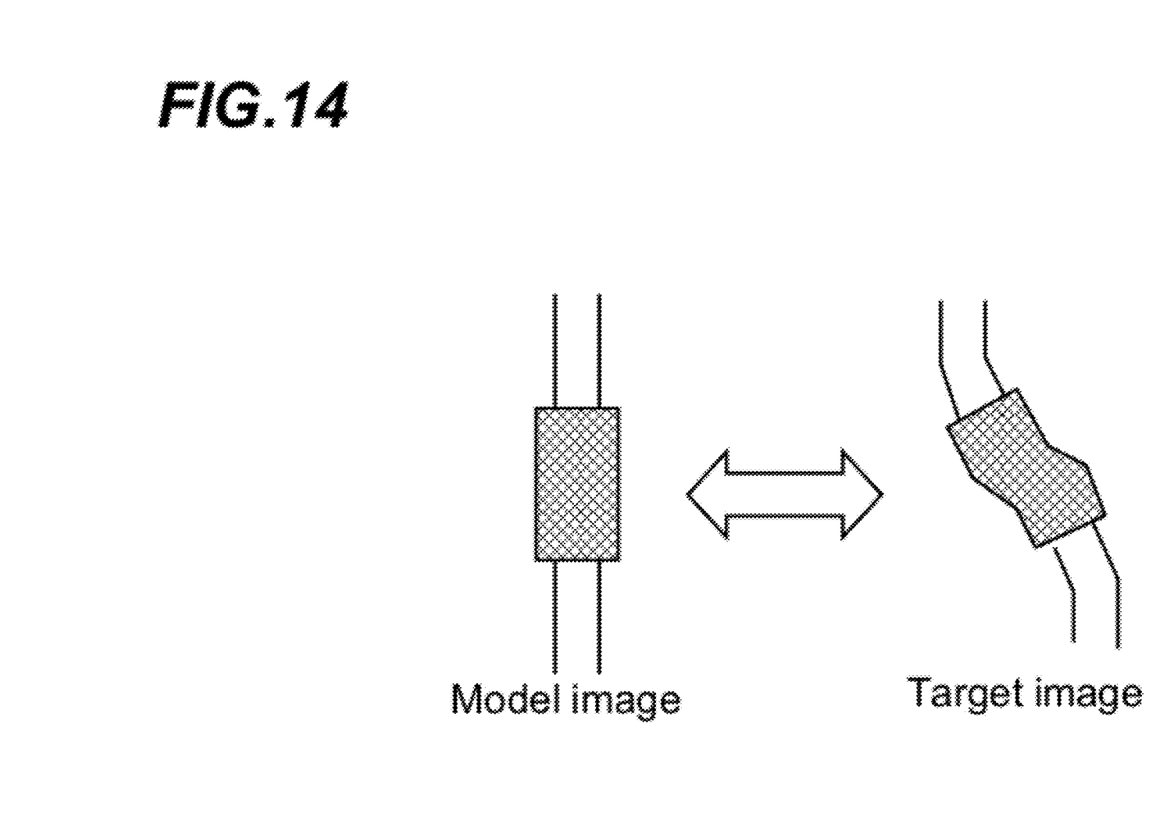
FIG. 14 is a schematic view as to the matching of a model image and an actual target image in a stent treatment.

While the exemplary embodiment is described in connection with the heart as an example of the object, the object is not limited thereto but may be an organ such as a lung, a brain or a tubular tissue, or a lesion such as a colon polyp, an aneurysm or a thrombus. The above-described technique for non-rigid registration may be used for matching a model image and an actual target image in a treatment of placing a stent in a narrowed tubular tissue. FIG. 14 is a schematic view as to the matching of a model image and an actual target image in a stent treatment.

In the exemplary embodiment described, volume data was selected as source image data. Applying the invention to slice image data as source image data should be considered. Additionally, arbitrary data representation of nodes and volume data should be considered. Where at least multidimensional array of vector, sets of multidimensional array, sparse or dense matrix, compressed or not is possible.

In the exemplary embodiment described, deformation force was implemented as finite elements linked as elastic body. Arbitrary physical representing model should be considered. Applying sheer strain is preferable. Algorithm where deforming forces are influenced by non-adjacent nodes is preferable. For example, setting strain for each node from whole row of the lattice is possible. For example, curvature may contribute strain.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A medical image processing apparatus deforming a plurality of image data, comprising:
    an image data storage that stores at least two image data of different phases of single target object;
    a node creating portion that creates nodes, wherein the nodes are related to positions in each of the at least two image data;
    a local force field calculating portion that calculates local force fields for the nodes, based on positions of the nodes and the at least two image data;
    a local force calculating portion that calculates local forces, each of which is acted in a corresponding one of the local force fields, from the local force fields; and
    an image deforming portion that deforms the positions of the nodes based on the local forces.

2. The medical image processing apparatus of claim 1, further comprising:
    a deforming force calculating portion that calculates deformation forces from position relationship of the nodes,
    wherein the image deforming portion deforms the nodes based on the local forces and the deformation forces.

3. The medical image processing apparatus of claim 2, wherein the deformation forces are influenced by non-adjacent nodes.

4. The medical image processing apparatus of claim 1, wherein the image data are volume data.

5. The medical image processing apparatus of claim 2, wherein the image data storage stores 3 or more image data of different phases;
    the local force field calculating portion calculates a set of 2 or more local force fields, wherein each local force field in the set is based on the positions of the nodes and a different choice of 2 or more 3 image data; and
    an image deforming portion that deforms the positions of the nodes based on the set of 2 or more local forces.

6. The medical image processing apparatus of claim 1, wherein the local force fields themselves are potential fields.

7. A medical image processing method for deforming a plurality of image data, the method comprising:
    (a) acquiring at least two image data of different phases of single target object;
    (b) creating nodes each of which is related to positions in each of the at least two image data;
    (c) calculating, by a processor, local force fields for each of the nodes, based on positions of the nodes and the at least two image data;
    (d) calculating local forces, each of which is acted in a corresponding one of the local force fields, from the local force fields; and
    (e) deforming the positions of the nodes based on the local forces.

8. The method of claim 7, wherein steps (c) to (e) are iteratively performed.

9. The method of claim 7, further comprising:
    (f) calculating deformation forces, wherein the nodes are deformed based on the local forces and the deformation forces.

10. The method of claim 7, wherein the image data are volume data.

11. The method of claim 7,
    wherein, in step (a), 3 or more image data of different phases are acquired,
    wherein, in step (c), a set of 2 or more local force fields is calculated, wherein each local force field in the set is based on the positions of the nodes and a different choice of 2 or more 3 image data, and wherein, in step (e), the positions of the nodes are deformed based on the set of 2 or more local forces.

12. The method of claim 7, wherein the local force fields themselves are potential fields.

13. The medical image processing apparatus of claim 1, wherein deforming the positions of the nodes by the image deforming portion results in deformed images, and wherein the medical image processing apparatus further comprises an image matching portion that matches the plurality of image data based on the deformed images.

14. The method of claim 7, wherein the step (e) of deforming the positions of the nodes based on the local forces results in deformed images, the method further comprising the step of (f) matching the plurality of image data based on the deformed images.

\* \* \* \* \*